(12) United States Patent
Hirabayashi

(10) Patent No.: US 6,256,413 B1
(45) Date of Patent: *Jul. 3, 2001

(54) IMAGE ENCODING APPARATUS

(75) Inventor: Yasuji Hirabayashi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/444,012

(22) Filed: May 18, 1995

(30) Foreign Application Priority Data

May 23, 1994 (JP) .................................................. 6-132622

(51) Int. Cl.⁷ ...................................................... G06K 9/36
(52) U.S. Cl. ............................................. 382/232; 382/236
(58) Field of Search .................................. 382/232, 236, 382/248, 251, 233, 130, 289, 291; 358/433, 426; 348/391, 405, 419; 364/725; 375/249, 2.35

(56) References Cited

U.S. PATENT DOCUMENTS

| | | | | |
|---|---|---|---|---|
| 4,467,346 | * | 8/1984 | Mori ....................... | 348/391 |
| 4,573,035 | * | 2/1986 | Dolazza ................ | 340/347 |
| 5,038,209 | * | 8/1991 | Hang ..................... | 348/419 |

(List continued on next page.)

FOREIGN PATENT DOCUMENTS

| | | | |
|---|---|---|---|
| 0239076 | 9/1987 | (EP) | ............................ H04N/1/133 |
| 0415373 | 3/1991 | (EP) | ............................... G06K/9/20 |
| 0427108 | 5/1991 | (EP) | ............................ H04N/7/137 |

(List continued on next page.)

OTHER PUBLICATIONS

Pat. Abs. Jp., vol. 017, No. 017, No. 115 (E–1330), Mar. 10, 1993 (JP 04–297184A).

"Image Data Compression: A Review", Jain, Proc. IEEE, vol. 69, No. 3, 3/81, pp. 349–389.

"Digital Video Compression—An Overview", Waltrich, J. Lightwave Tech., vol. 11, No. 1, Nov. 1, 1993, pp. 70–75.

(List continued on next page.)

*Primary Examiner*—Jose L. Couso
*Assistant Examiner*—Anh Hong Do
(74) *Attorney, Agent, or Firm*—Fitzpatrick, Cella, Harper & Scinto

(57) ABSTRACT

There are disclosed an image encoding apparatus comprising an input unit for inputting image data, a calculation unit for calculating an entropy of the image data inputted by the input unit, a control unit for controlling a quantization step in accordance with the entropy calculated by the calculation unit, and an encoding unit for encoding the image data inputted by the input unit in accordance with the quantization step controlled by the control unit, an image encoding apparatus comprising an input unit for inputting image data, a calculation unit for calculating an entropy of the image data inputted by the input unit, a transform unit for orthogonally transforming the image data inputted by the input unit, a mask unit for masking transform coefficients of the image data transformed by the transform unit, and an encoding unit for encoding the image data masked by the mask unit. The mask area by the mask unit is determined in accordance with the entropy calculated by the calculation unit, and an image encoding apparatus comprising an input unit for inputting image data of block comprising a plurality of pixels, a transform unit for orthogonally transforming the block image data inputted by the input unit, a mask unit for masking transform coefficients of the block image data transformed by the transform unit, and an encoding unit for encoding the block image data masked by the mask unit.

20 Claims, 13 Drawing Sheets

U.S. PATENT DOCUMENTS

| | | | |
|---|---|---|---|
| 5,040,217 | * | 8/1991 | Brandenburg et al. ............. 395/2.35 |
| 5,063,608 | | 11/1991 | Siegel ...................................... 382/56 |
| 5,091,782 | * | 2/1992 | Krausse et al. ...................... 382/236 |
| 5,109,451 | * | 4/1992 | Aono et al. ........................... 382/248 |
| 5,202,770 | * | 4/1993 | Murakami et al. ................... 358/426 |
| 5,253,054 | | 10/1993 | Fujiwara et al. ..................... 358/133 |
| 5,341,440 | * | 8/1994 | Earl et al. ............................. 382/233 |
| 5,355,167 | * | 10/1994 | Juri ....................................... 348/405 |
| 5,371,606 | | 12/1994 | Katayama et al. ................... 358/400 |
| 5,416,604 | * | 5/1995 | Park ...................................... 358/433 |
| 5,426,512 | * | 6/1995 | Watson ................................. 382/232 |
| 5,491,761 | * | 2/1996 | Kim ...................................... 382/251 |
| 5,537,492 | * | 7/1996 | Nakajima et al. .................... 382/232 |
| 5,589,993 | * | 12/1996 | Naimpally ............................. 386/81 |
| 5,592,302 | | 1/1997 | Hirabayashi ......................... 358/433 |

FOREIGN PATENT DOCUMENTS

| | | | |
|---|---|---|---|
| 0562787 | 9/1993 | (EP) | ............................... H04N/7/13 |
| 0581593 | 2/1994 | (EP) | ............................... H04N/7/14 |
| 0606780 | 7/1994 | (EP) | ............................... G06K/9/32 |
| 0631443 | 12/1994 | (EP) | ............................. H04N/7/133 |
| 0685971 | 12/1995 | (EP) | ............................... H04N/7/50 |
| 6-90441 | 3/1994 | (JP) | ............................. H04N/7/137 |
| 92/09173 | 5/1992 | (WO) | ............................... H04N/7/13 |
| 94/00949 | 1/1994 | (WO) | ............................... H04N/1/415 |

OTHER PUBLICATIONS

"Digitale Bildcodierung (Teil 8) Transformationcodierung (2)", Hartwig et al., Farnseh und Kinotechnik, vol. 49, No. 9, Sep. 1, 1992, pp. 597–602, 604, 606 and 607.

"Picture Coding: A Review", Natravali et al., Proc. IEEE, vol. 68, No. 3, Mar. 1980, pp. 366–407.

"Advances in Picture Coding", Musmann et al., Proc. IEEE, vol. 73, No. 4, Apr. 1, 1985, pp. 523–548.

"Spectral Entropy–Activity Classification in Adaptive Transform Coding", Mester et al., IEEE J. Selected Areas in Communications, vol. 10, No. 5, Jun. 1, 1992, pp. 913–917.

A General Architecture of Video Codec For Real Time Communication at 64 kbit/s, Balestri et al., Signal Processing Image Comm., vol. 1, No. 2, Oct. 1, 1989, pp. 239–243.

Pat. Abs. Jp., vol. 15, No. 299 (E–1095) Jul. 30, 1991 (JP 3106126A).

Pat. Abs. Jp., vol. 010, No. 268 (E–436), Sep. 12, 1986 (JP 61092073A).

Pat. Abs., Jp., vol. 015, No. 372 (P–1254), Sep. 19, 1991 (JP 03144864).

"DCT source coding and current implementations for HDTV", Barbero et al., EBU Review–Technical, No. 251, Jan. 1, 1992, pp. 22–33.

* cited by examiner

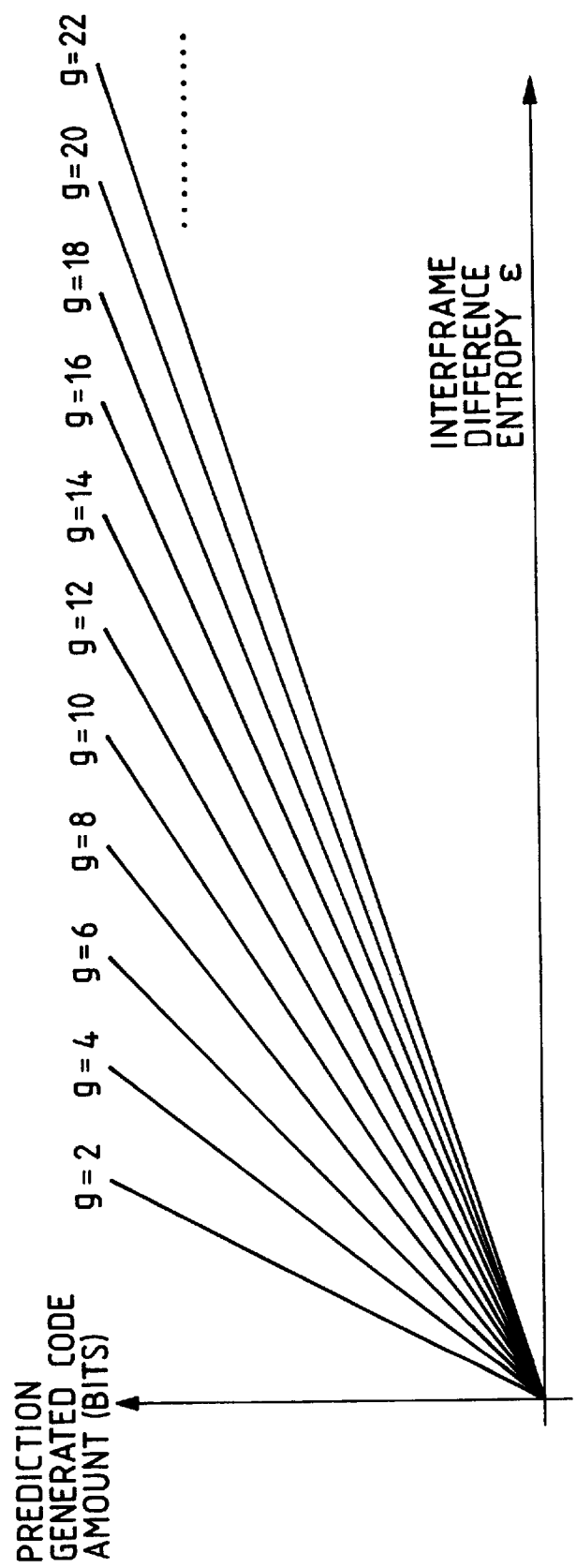

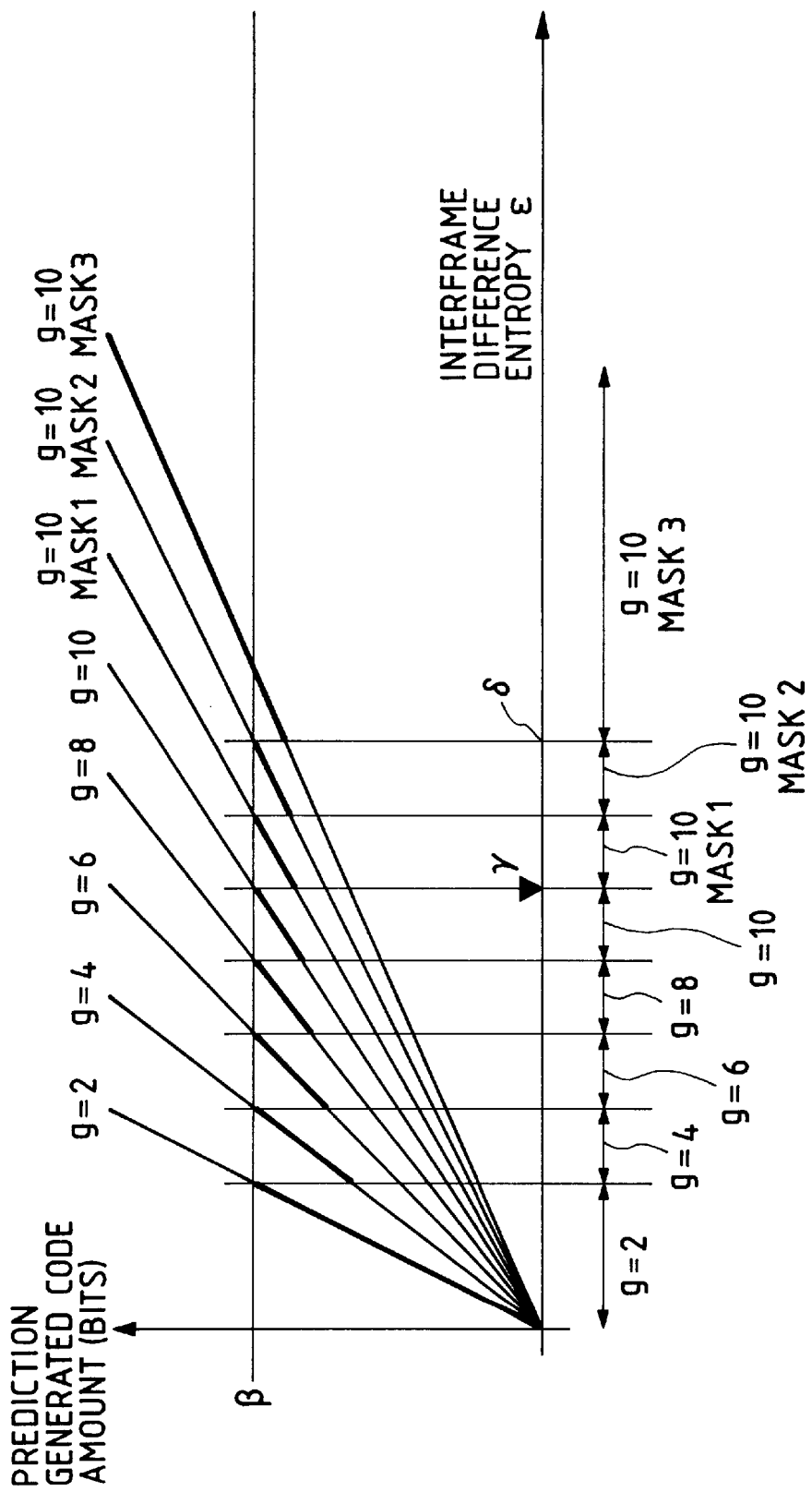

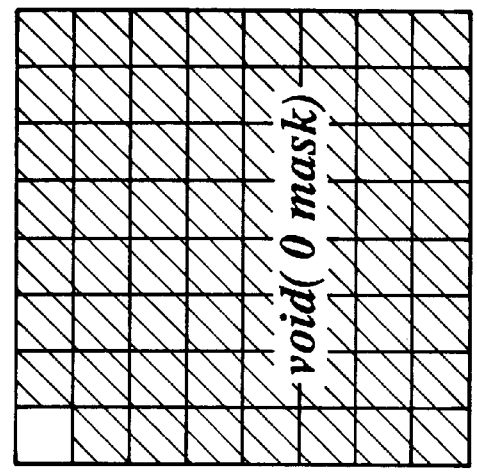
FIG. 13A — MASK 1
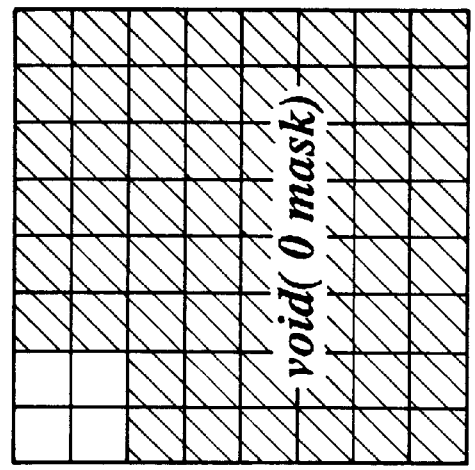
FIG. 13B — MASK 2
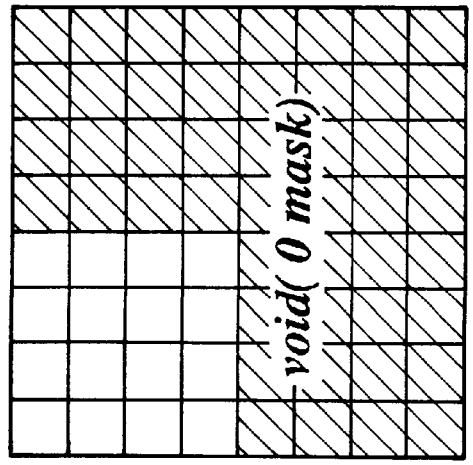
FIG. 13C — MASK 3

IMAGE ENCODING APPARATUS

BACKGROUND OF THE INVENTION

1. Field of the Invention

The present invention relates to an encoding apparatus for encoding image data, and more particularly to code quantity control.

2. Related Background Art

Prior art code quantity control system for an image encoding apparatus for encoding image data is generally divided into two systems.

One system controls a coding quantity for each frame such that the encoding of each frame is completed within a preset target frame rate.

The other system determines a quantization step by an appropriate method and a next frame determined by a generated code quantity is used for encoding.

The former system is used in an application in which a relatively high image quality and stable frame supply are required such as animation image for storage or broadcast. In this code quantity control, a quantization step by a generated code buffer is controlled, that is, a buffer memory is provided in a preceding stage to a code output and the occupancy of the buffer memory is always monitored, and when the generated code quantity is larger than a target code quantity, the quantization step is rendered relatively large, and when the generated code quantity is smaller than the target code quantity, the quantization step is rendered small.

The latter system is used in an application in which real time encoding/decoding such as a TV telephone or TV conference is effected at a low code rate. In this system, the code quantity control is not effected in a simplest case.

However, in the prior art image encoding apparatus, when low bit rate real time encoding transmission is to be effected, the following problems are encountered whichever of the above two systems is used.

In the former system, that is, the fixed frame rate system, the code once encoded and transmitted cannot be cancelled because of the real time encoding transmission, and if the code quantity generated by the encoding of one frame exceeds a transmission line rate per frame rate, a time lag is involved when the code is decoded. In order to avoid this occurring, the generated code quantity must be suppressed to some extent so that the quantization should be effected in a manner to avoid the deterioration of the image quality. This means the generation of wasteful code which should be absolutely avoided in the low bit rate real time encoding transmission. Since the information quantity of the frame greatly differs from frame to frame, if the same code quantity is allotted to each of the frames, the frame having a small information quantity is of unnecessarily high quality and the frame having a large information quantity is of low image quality. Thus, where the frame rate is fixed, the control of the code rate is very difficult to attain.

In the latter system, that is, the system for determining the quantization step by the appropriate method, single quantization step is frequently used. In this case, when a frame having a large information quantity is encoded, a very large volume of code should be generated and a time required before reading the next frame is very long. On the other hand, when a frame having a small information quantity is to be encoded, one frame of encoding is completed without generating substantial amount of code so that the time required before reading the next frame is very short. As a result, an important image having the large information quantity is not quickly updated at a receiving station and hence at a low frame rate, and on the other hand, a less important image having no substantial change in the image is quickly updated, that is, at a high frame rate. Accordingly, a user cannot designate the number of frames to be transmitted in one second (a frame rate) but can merely indicate to increase or decrease the image quality.

SUMMARY OF THE INVENTION

It is an object of the present invention to provide an image encoding apparatus which exactly controls in a simple process a code quality generated when image data is encoded in order to encode the image data.

In one preferred aspect of the present invention, there is provided an image encoding apparatus comprising: input means for inputting image data; calculation means for calculating an entropy of the image data inputted by said input means; control means for controlling a quantization step in accordance with the entropy calculated by said calculation means; and encoding means for encoding the image data inputted by said input means in accordance with the quantization step controlled by said control means.

In accordance with another aspect of the present invention, there is provided an image encoding apparatus comprising: input means for inputting image data; calculation means for calculating an entropy of the image data inputted by said input means; transform means for orthogonally transforming the image data inputted by said input means; mask means for masking transform coefficients of the image data transformed by said transform means; a mask area by said mask means being determined in accordance with the entropy calculated by said calculation means; and encoding means for encoding the image data masked by said mask means.

In accordance with a further aspect of the present invention, there is provided an image encoding apparatus comprising: input means for inputting image data of block comprising a plurality of pixels; transform means for orthogonally transforming the block image data inputted by said input means; mask means for masking transform coefficients of the block image data transformed by said transform means; and encoding means for encoding the block image data masked by said mask means.

Other objects, features and advantages of the invention will become apparent from the following detailed description taken in conjunction with the accompanying drawings.

BRIEF DESCRIPTION OF THE DRAWINGS

FIG. 3 shows a relation between an entropy $\epsilon$ and a generated code quantity in the first embodiment.

FIG. 12 illustrates a method for determining a quantization step from an entropy of a calculated difference between frames, and FIGS. 13A to 13C show mask shapes for masking a DCT transform coefficient.

DETAILED DESCRIPTION OF THE PREFERRED EMBODIMENTS

A first embodiment of the present invention is now explained in conjunction with the drawings.

Figure 1:
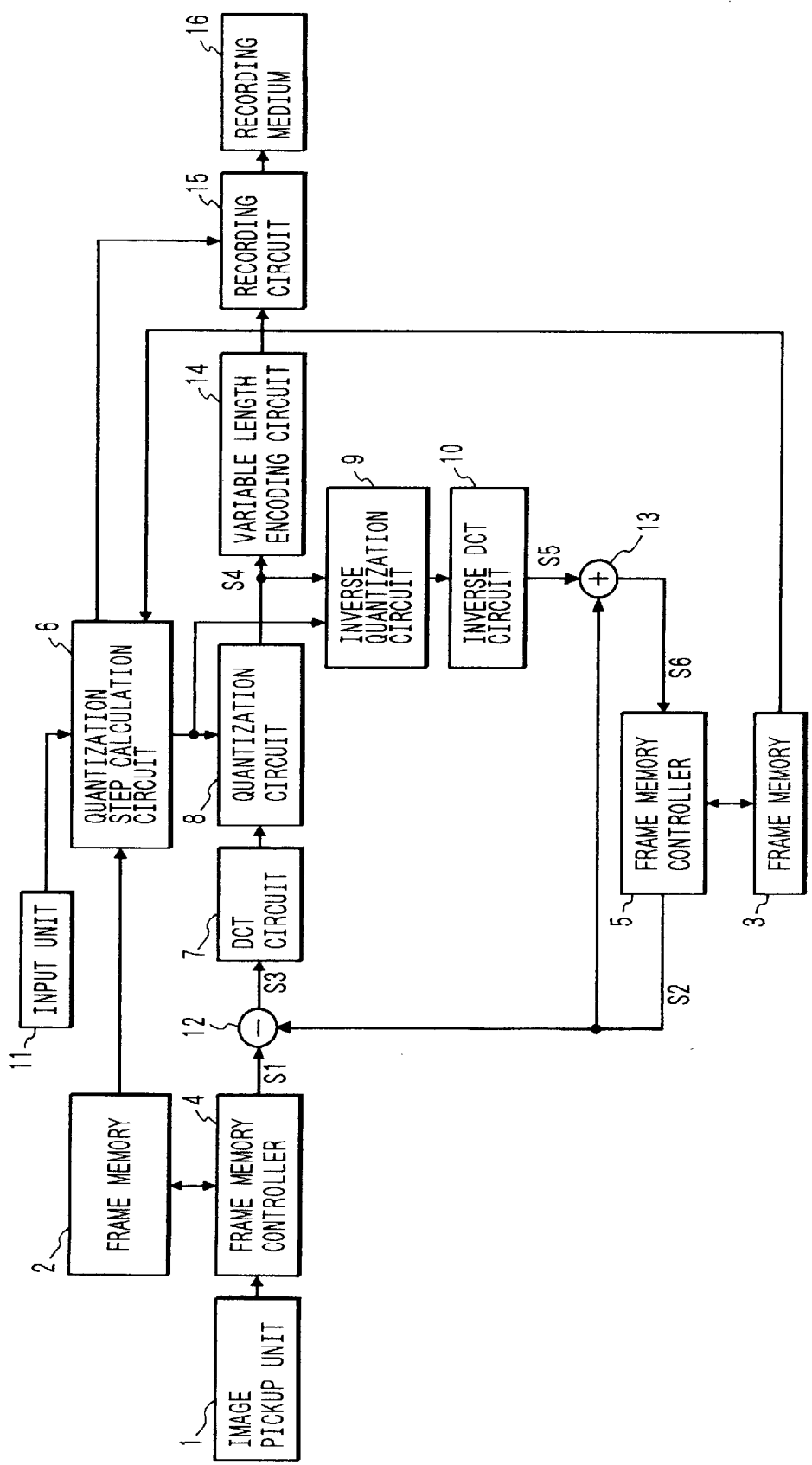
FIG. 1 shows a block diagram of a configuration of an image encoding apparatus in accordance with a first embodiment of the present invention.

FIG. 1 shows a block diagram of the image encoding apparatus in accordance with the first embodiment of the present invention.

In FIG. 1, image data (an original image) picked up by an image pickup unit 1 comprising an image pickup element (for example, CCD) is supplied to an image memory controller 4.

The frame memory controller 4 writes input image data to a frame memory 2. The frame memory controller 4 is connected to the frame memory 2 so that image memory may be written and read to and from the frame memory 2 through the frame memory controller 4.

The image data read from the frame memory 2 by the frame memory controller 4 is supplied to a subtraction circuit 12.

The subtraction circuit 12 calculates a difference between the image data S1 outputted from the frame memory controller 4, that is, the original image data stored in the frame memory 2 and the image data S2 outputted from the frame memory controller 5, that is, the previous image data stored in the frame memory 3 and supplies the difference data S3 to a DCT circuit 7.

The image data outputted from the frame memory controller 4 is outputted by block which comprises a plurality of pixels, for example, (8 pixels vertically×8 pixels horizontally). The image data S2 outputted from the frame memory controller 5 is previous image data (block) at the same position as that of the original image data S1.

The DCT circuit 7 DCT transforms the difference data outputted from the subtraction circuit 12 and supplies it to a quantization circuit 8.

The quantization circuit 8 quantizes the DCT transformed data based on the quantization step data outputted from a calculation circuit 6.

The calculation circuit 6 has an input unit 11 and the frame memories 2 and 3 connected thereto. The calculation circuit 6 determines the quantization step by a method to be described later based on the frame rate supplied from the input unit 11 the image data read from the frame memories 2 and 3.

The quantized data quantized by the quantization circuit 8 is supplied to an inverse quantization circuit 9 and to a variable length encoding circuit 14.

The variable length encoding circuit 14 encodes the input data with variable length by using the Huffman code and supplies it to a record circuit 15.

The record circuit 15 multiplexes the quantization step data outputted from the calculation circuit 6 to the encoded data outputted from the variable length encoding circuit 14, modulates it for recording on a recording medium (for example, a magnetic tape or an magneto-optical disk) and records the multiplexed data on the recording medium 16.

The inverse quantization circuit 9 inverse-quantizes the quantized data outputted from the quantization circuit 8 into DCT coefficient data. The quantization step data supplied to the quantization circuit 8 is supplied to the inverse quantization circuit 9 from the calculation circuit 6.

The DCT coefficient data outputted from the inverse quantization circuit 9 is supplied to a de-DCT circuit 10 for de-DCT transform so that it is transformed to substantially same difference data S5 as the difference data S3.

An addition circuit 13 adds the difference data S5 from the de-DCT circuit 10 and the image data S2 from the frame memory controller 5 to produce substantially same image data S6 as the image data S1.

The frame memory controller 5 stores the image data S6 from the addition circuit 13 in the frame memory 3.

When one block of processing is completed through the above steps and the encoding of one frame of code of the frame memory 2 is completed by similar processes, the frame memory 3 now stores therein the decoded image of the image stored in the frame memory 2.

Subsequently, new image data is inputted to the frame memory 2 from the image pickup unit 1 through the frame memory controller 4. Assuming that a time therefor is t, a code quantity required for the encoding of one frame is B and a target frame rate inputted by the user is f (frames per second), the following relation is got from the above control process:

$$B_0/B = 1/(t-t_0) = f \qquad (1)$$

The control process conducted by the calculation circuit 6 is now explained.

The image data of the frame memory 2 and the image data of the frame memory 3 are inputted to the calculation circuit 6 by pixel. For the convenience of explanation, those image data are referred to as frame A and frame B, respectively.

The calculation circuit 6 first calculates an entropy of a difference of pixels between the frame A and the frame B.

Figure 2A:
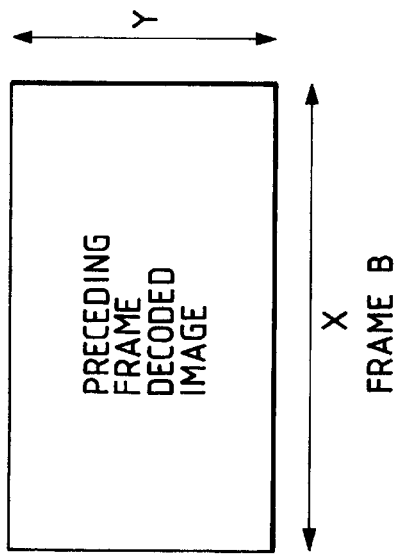
FIGS. 2A to 2C show histograms generated by a quantization step calculation circuit 6.
Figure 2B:
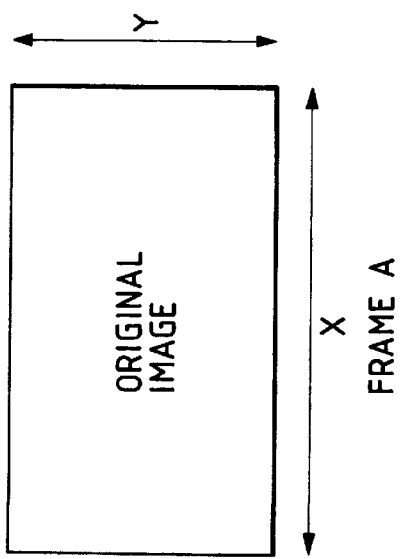

As shown in FIGS. 2A and 2B, it is assumed that an image size of each frame is X×Y (horizontal×vertical) pixels and each bit is 8-bit multi-value brilliance information.

In order to determine a histogram of the pixel difference, 511 registers R[0]–R[510] are provided in a memory such as a RAM, not shown.

When a pixel value at a coordinate (i, j) of the frame A is represented by Pa(i, j) and a pixel value at the coordinate (i, j) of the frame B is represented by Pb(i, j), an operation of the following formula is performed for all pixels, that is, $0 \leq i < X$ and $0 \leq j < Y$.

$$R[Pa(i,j) - Pb(i,j) + 255] + + \qquad (2)$$

where ++ represents an increment.

Figure 2C:
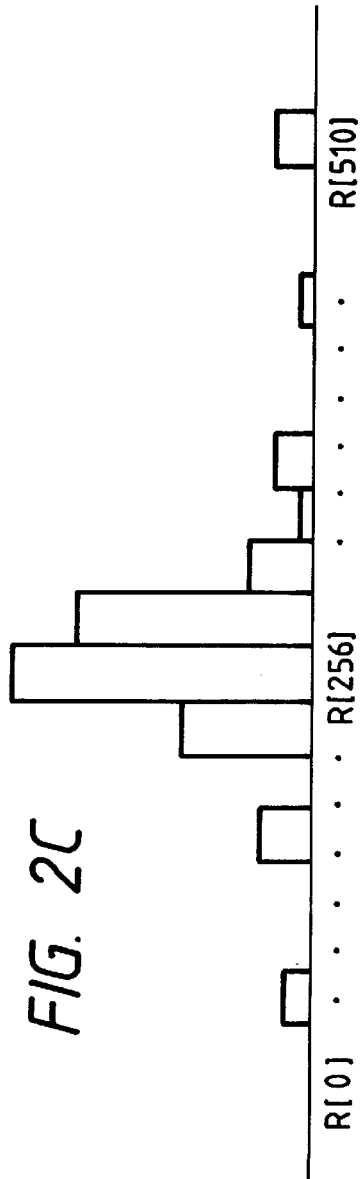

A histogram thus generated is shown in FIG. 2C. From the value of $R[n] (0 \leq n \leq 510)$, an entropy $\epsilon$ of the pixel value difference is determined.

The entropy $\epsilon$ is inherently determined by the following formula:

$$\varepsilon = \sum_{n=0}^{510} -\frac{R[n]}{XY}\log_2 \frac{R[n]}{XY} \quad (3)$$

However, since the values X and Y are fixed, the operation in the sigma (Σ) in the formula (3) can be conducted by a table relating to R[n]. The table T[R[n]] can be determined by the formula:

$$T[i] = -\frac{i}{XY}\log_2 \frac{i}{XY} \quad (4)$$

By using the formula (4), the entropy $\epsilon$ is represented by the following formula so that the entropy $\epsilon$ can be simply calculated by the table look-up and the addition.

$$\varepsilon = \sum_{n=0}^{510} T[R[n]] \quad (5)$$

Figure 4:
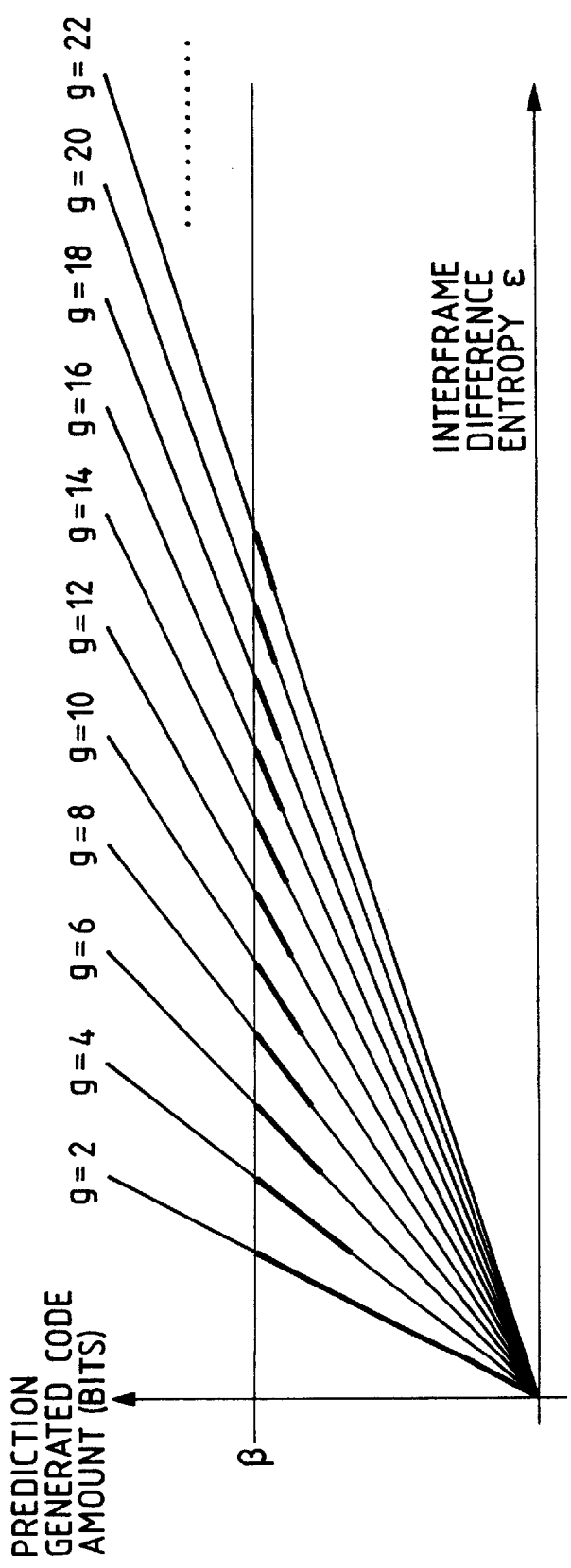
FIG. 4 illustrates a method for determining a threshold of a quantization step from a frame rate and a transmission line speed in the first embodiment.
Figure 5:
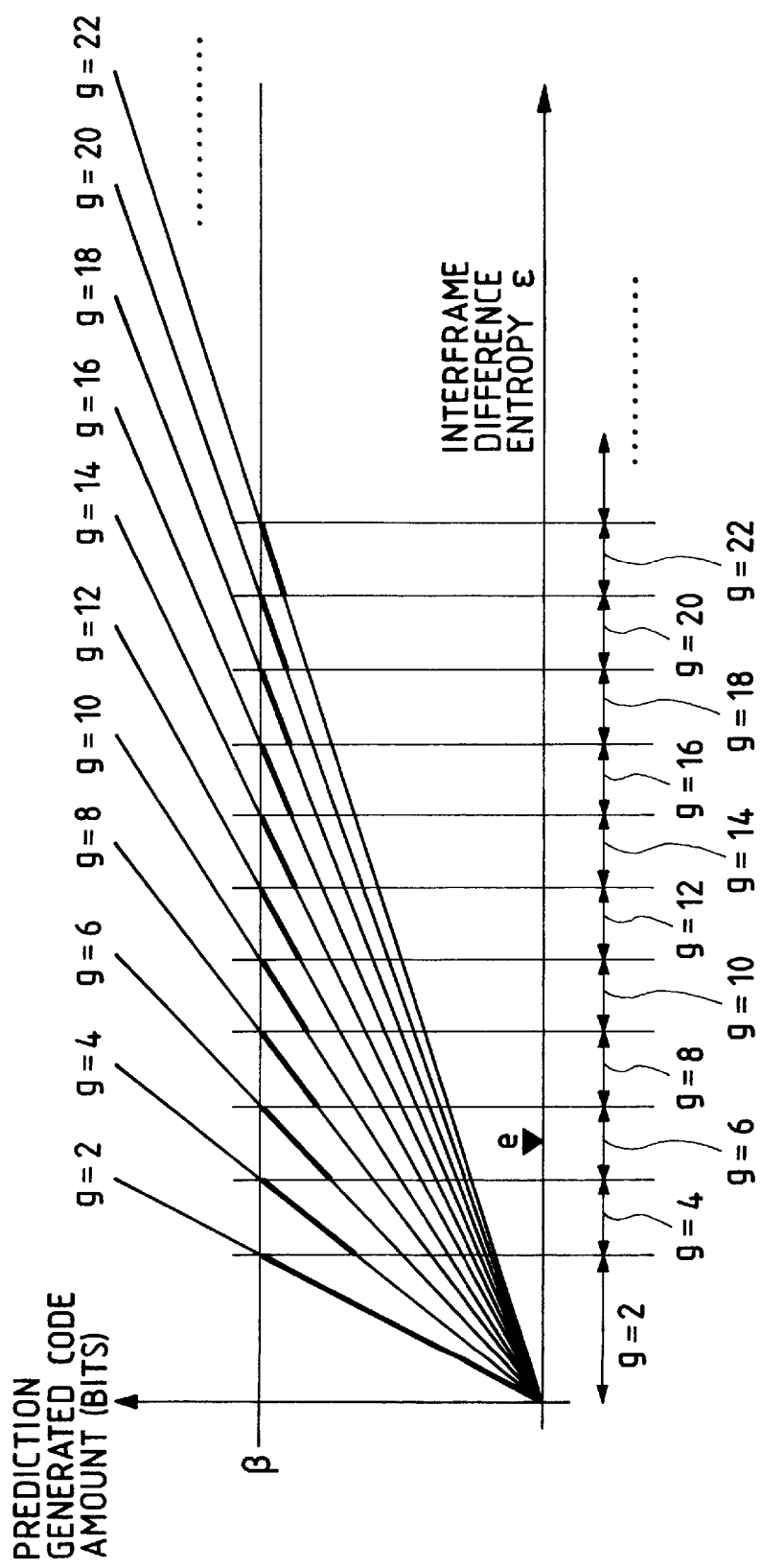
FIG. 5 illustrates a method for determining a quantization step from an entropy of a calculated difference between frames in the first embodiment.

The quantization step is determined by the entropy $\epsilon$ thus determined and the target frame rate f designated by the user. Referring to FIGS. 3 to 5, a method for determining the quantization step is explained.

FIG. 3 shows a graph of a relation between the entropy $\epsilon$ inherent to the encoding system and the generated code quantity with the quantization step g being a parameter. Each line is referred to as a generated code quantity prediction line (hereinafter prediction line) and the prediction lines as a whole are referred to as a prediction line group. The prediction line group is stored in a ROM, not shown, in the quantization step calculation circuit 6 as table data.

When the user designated frame rate is f, a line of the following formula drawn on the graph of FIG. 3 by using the transmission lone speed $B_0$ is shown by a graph of FIG. 4.

$$\text{Bits}=\beta=B_0/f \quad (6)$$

The quantization step g is determined by using the $\epsilon$ coordinates of the crosspoints of the line Bits=β and the prediction lines for g=2, 4, . . . as thresholds.

FIG. 5 shows a method for determining the quantization step g from the entropy $\epsilon$ calculated above. For example, when the value of the entropy $\epsilon$ is at a position shown by ▼($\epsilon$=e), the quantization step g is '6'. If the value of f designated by the user is a discrete value, the threshold may also be predicted and the quantization step g can be determined by merely comparing the threshold group determined by the target rate f and the entropy $\epsilon$ determined by the calculation.

The quantization step g is determined in this manner and the generated code quantity in encoding by using the quantization step g is roughly plotted in the vicinity of a thick line in FIG. 4. Namely, the generated code quantity is close to $B_0/f(=\beta)$.

The code quantity control process conducted by the quantization circuit 8 of FIG. 1 is explained again.

The difference data S3 by block comprising, for example, 8×8 pixels outputted from the subtraction circuit 12 of FIG. 1 is DCT transformed into the DCT transformed data by the DCT circuit 7. The dynamic range of the DCT coefficient is, for example, ±11 bits.

It is quantized by the quantization circuit 8 by using the calculated quantization step g. The quantization step g may assume values 2 to 128 and the values after the quantization are encoded by the variable length encoding circuit 14.

In accordance with the present embodiment, since the quantization step g is changed in accordance with the user designated frame rate f and the entropy $\epsilon$ of the difference between frames, the image can be encoded at the substantially constant frame rate with the simple operation.

Figure 6:
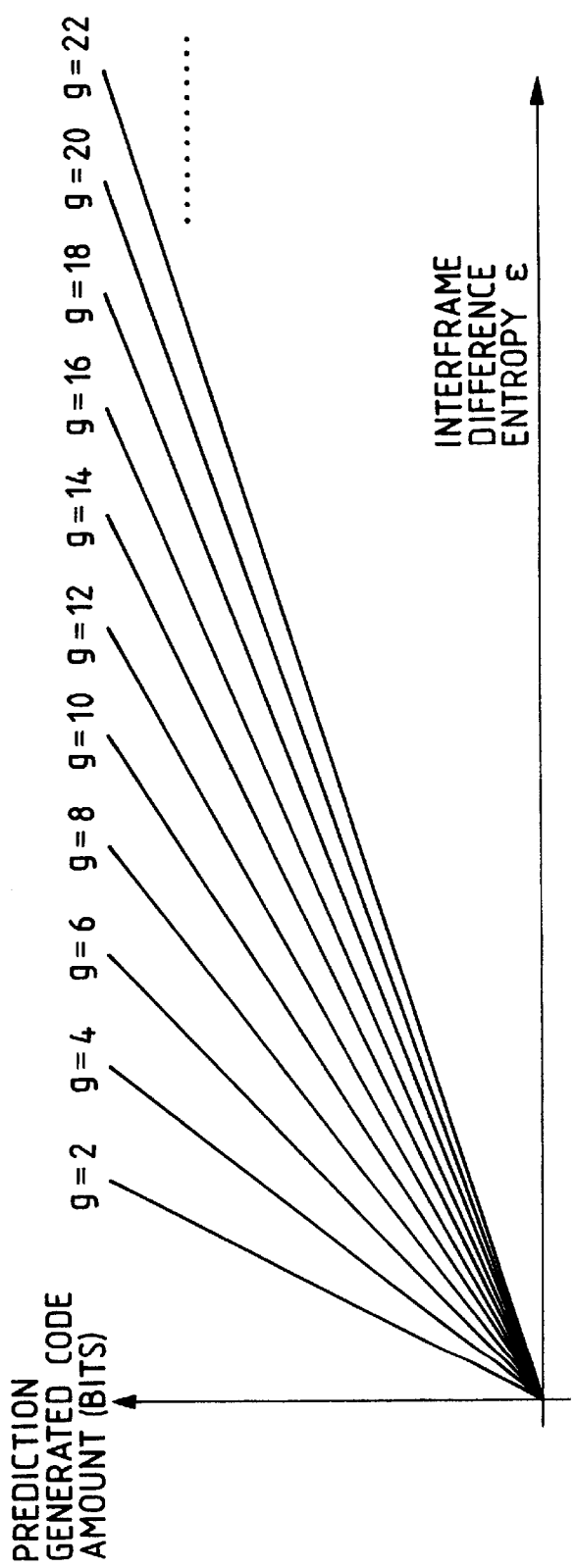
FIG. 6 shows a relation between an entropy $\epsilon$ and a generated code quantity in a second embodiment.
Figure 7:
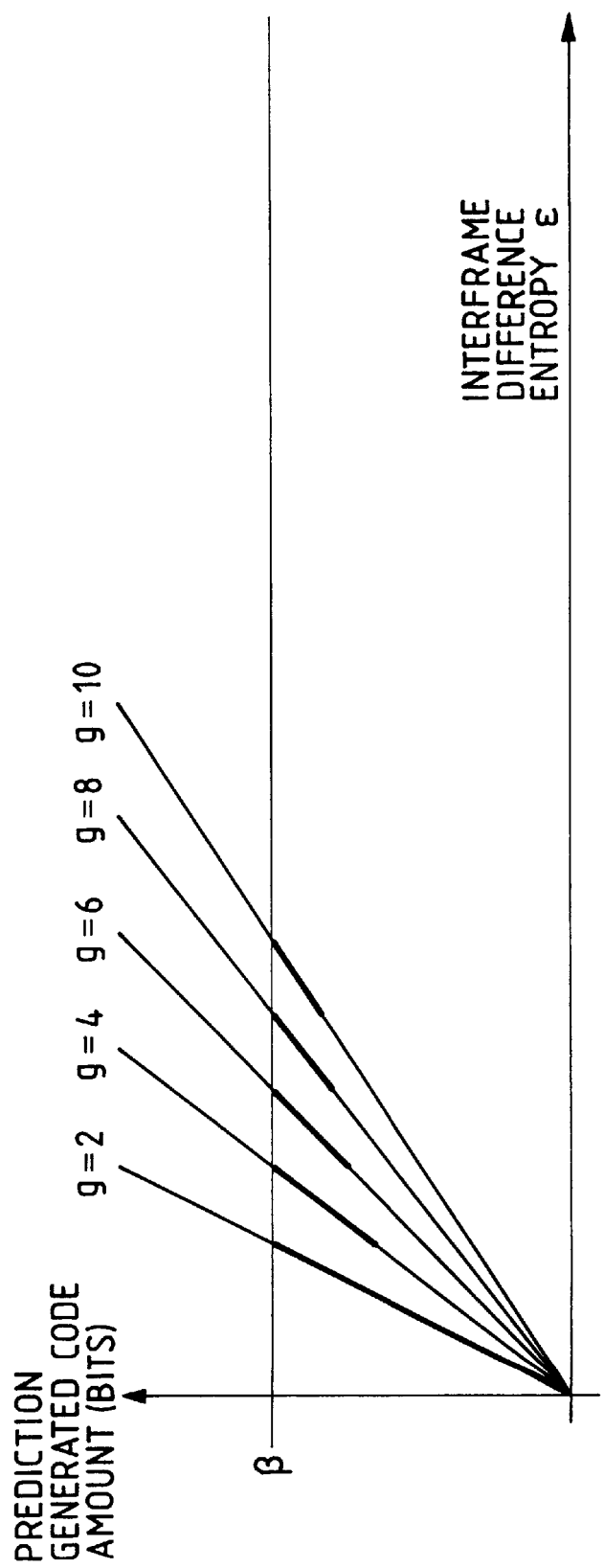
FIG. 7 illustrates a method for determining a threshold of a quantization step from a frame rate and a transmission line speed.
Figure 8:
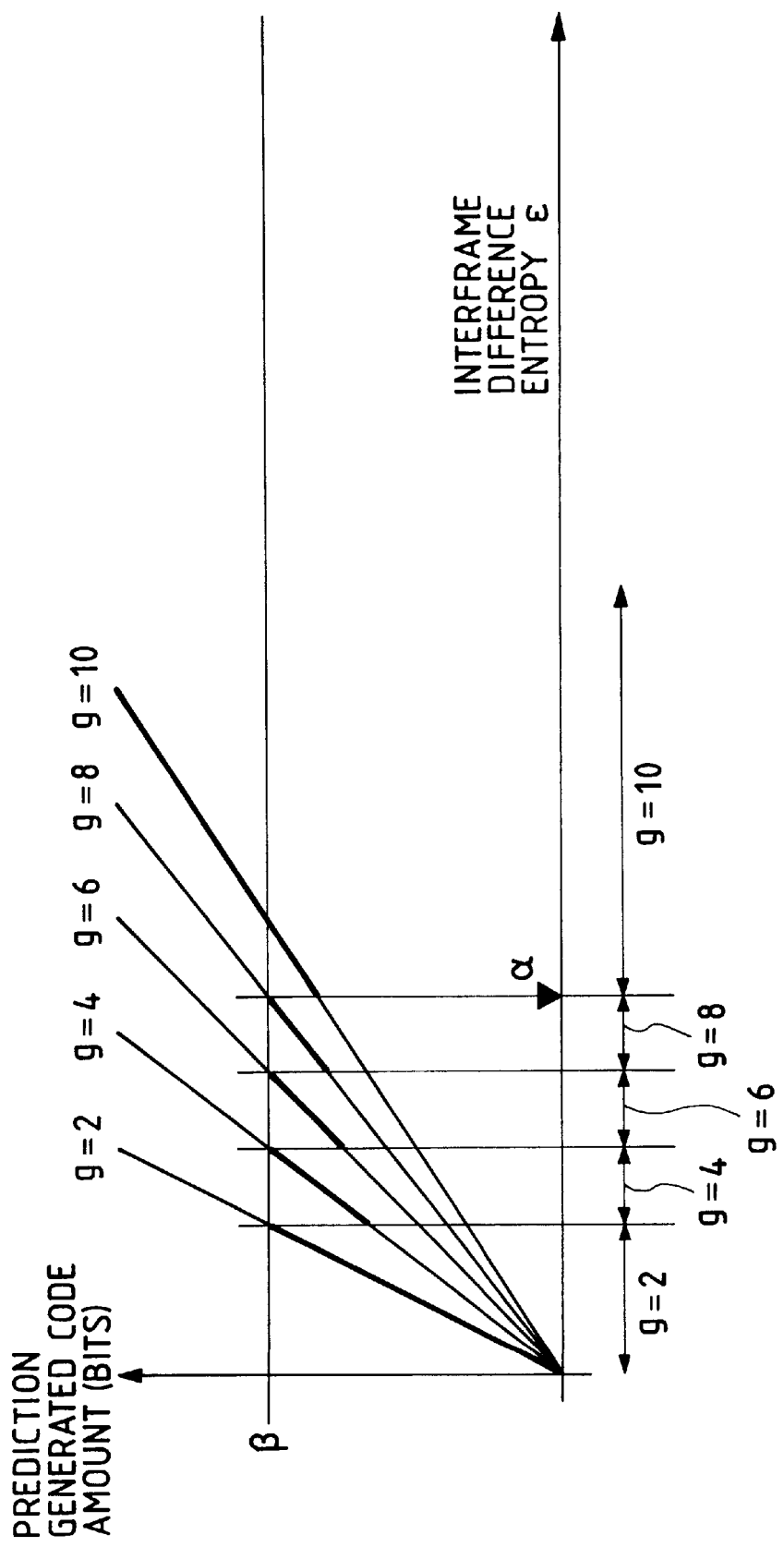
FIG. 8 illustrates a method for determining a quantization step from an entropy of a calculated difference between frames.

Referring to FIGS. 6 to 8, a second embodiment of the present invention is now explained. FIGS. 6 to 8 correspond to FIGS. 3 to 5 of the first embodiment and show a relation between the entropy $\epsilon$ and the generated code quantity.

In the first embodiment, the primary object is to fix the frame rate while in the second embodiment, the primary object is to fix the frame rate as much as possible while maintaining a high image quality.

The second embodiment is attained by modifying only the control process of the first embodiment and the configuration of the image encoding apparatus is identical to that of FIG. 1.

First, a quantization step g (maximum) at which the decoded image is deteriorated in visual quality is determined by a subjective experience. In the present embodiment, it is assumed that g=10 and the quantization step g which is larger than that is not used.

Then, a line of the following formula is drawn on the graph of FIG. 6 by using the frame rate f as it is in the first embodiment to get a graph of FIG. 7.

$$\text{Bits}=\beta=B_0/f \quad (7)$$

The crosspoints of the line Bits=β and the prediction lines (g=2, . . . , 10) are the thresholds of the entropy $\epsilon$ to switch the quantization step g as they do in the first embodiment, but the allocation of the quantization step g to the entropy $\epsilon$ is done as shown in FIG. 8. Namely, as shown in FIG. 8, g=10 is always fixed in an area of $\epsilon>\alpha$ and as the entropy $\epsilon$ increases, the generated code quantity increases. This means that the actual frame rate is lower than the setting f but the minimum image quality is maintained. On the other hand, in an area of $\epsilon<\alpha$, the frame rate may be set to f as it is in the first embodiment.

Other process, that is, the overall configuration of the encoding and the control process of the encoder are identical to those of the first embodiment and the explanation thereof is omitted.

In accordance with the present embodiment, since the upper limit of the quantization step g is set in controlling the generated code quantity, the maintenance of the high image quality is prioritized and the desired frame rate can be maintained in the low entropy area of the difference between frames.

Referring to FIGS. 9 to 13C, a third embodiment of the present invention is explained.

Figure 9:
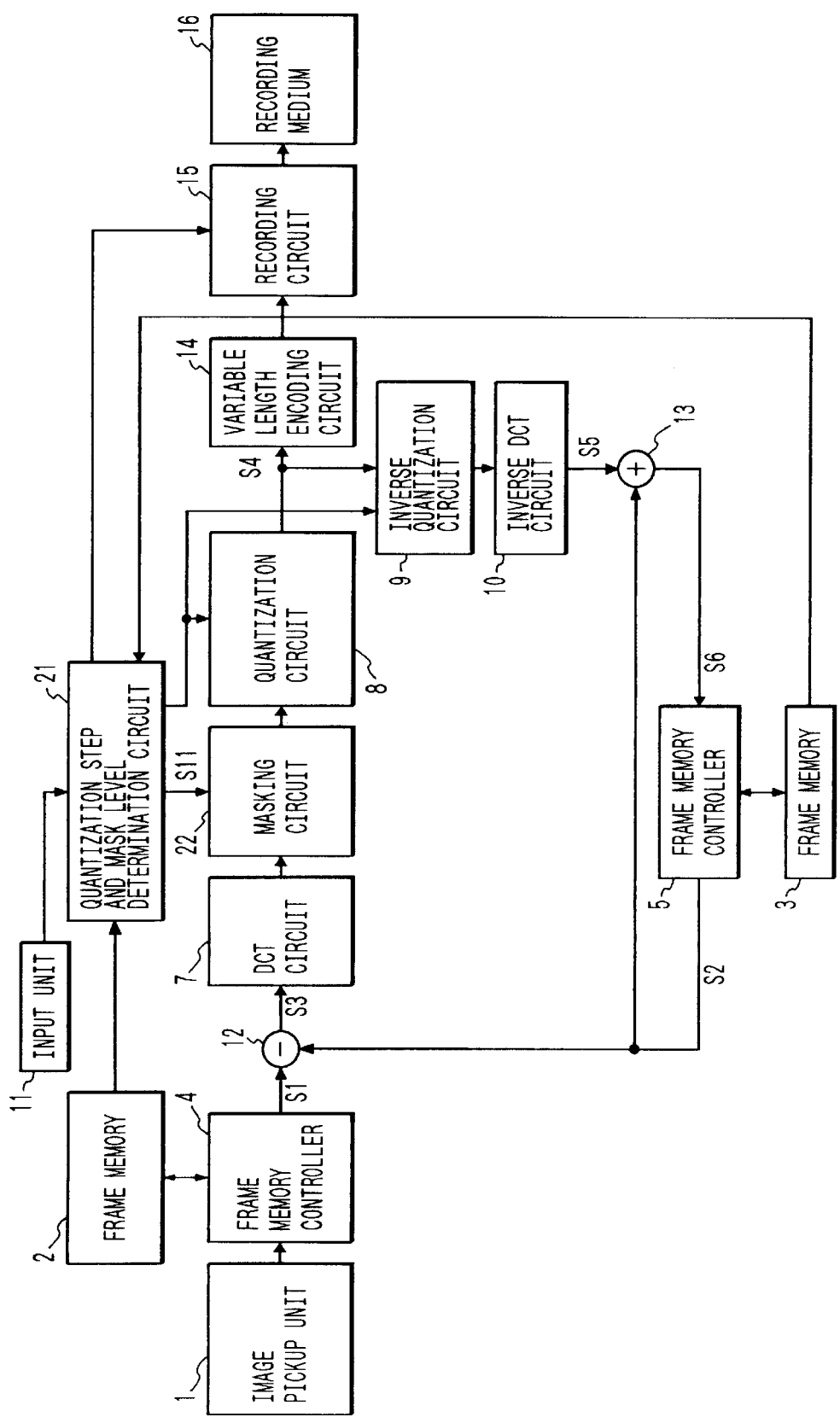
FIG. 9 shows a block diagram of a configuration of an image encoding apparatus in accordance with a third embodiment of the present invention.

FIG. 9 shows a block diagram of a configuration of an image encoding apparatus of the third embodiment of the present invention.

In the image encoding apparatus of the first embodiment, the quantization step calculation circuit 6 merely determines the quantization step. In the image encoding apparatus of the third embodiment, the quantization step calculation circuit 6 is replaced by a quantization step and mask level determination circuit 21, and the determination circuit 21 determines not only the magnitude of the quantization step but also a mask level for the DCT transform coefficient.

In addition, a masking circuit 22 is provided between the DCT circuit 7 and the quantization circuit 8.

The masking circuit 22 receives a mask level signal S11 outputted from the determination circuit 21 and masks the DCT coefficient data outputted from the DCT circuit 7 based on the mask level signal S11.

In FIG. 9, the like elements to those of FIG. 1 are designated by like numerals and the explanation thereof is omitted.

Figure 10:
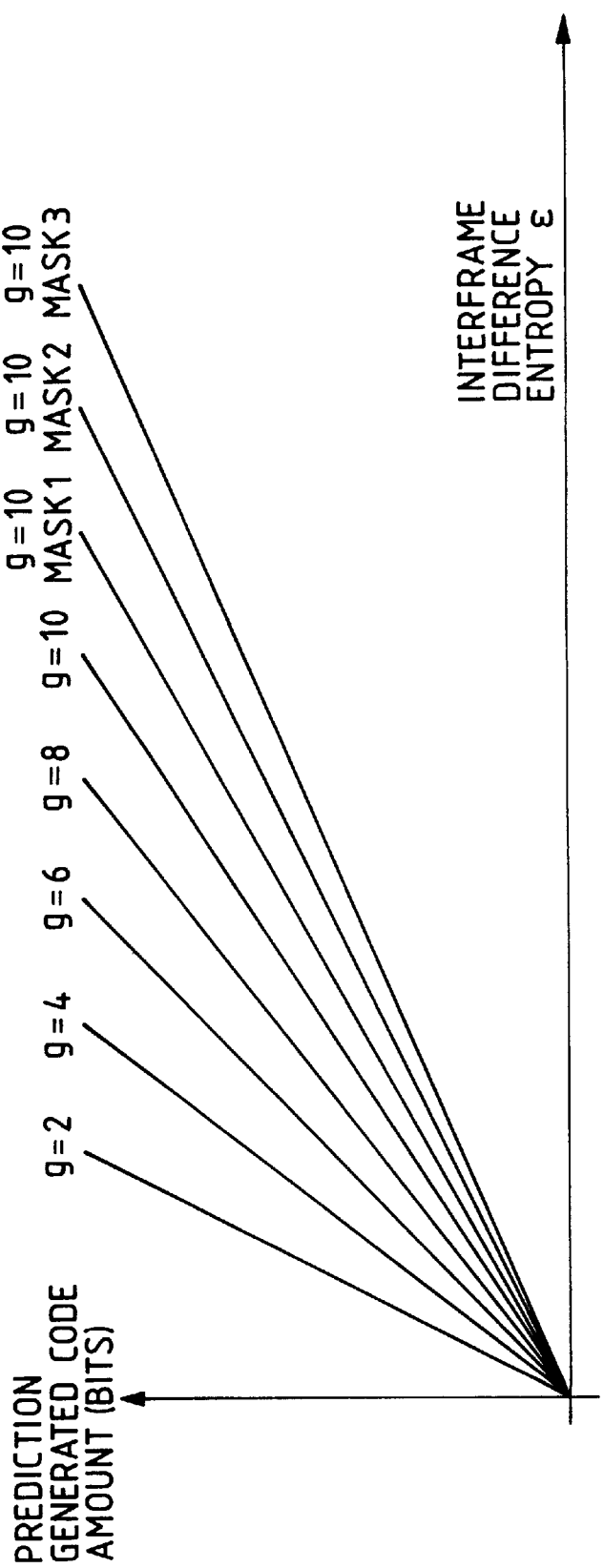
FIG. 10 shows a relation between an entropy $\epsilon$ and a generated code quantity in the third embodiment.
Figure 11:
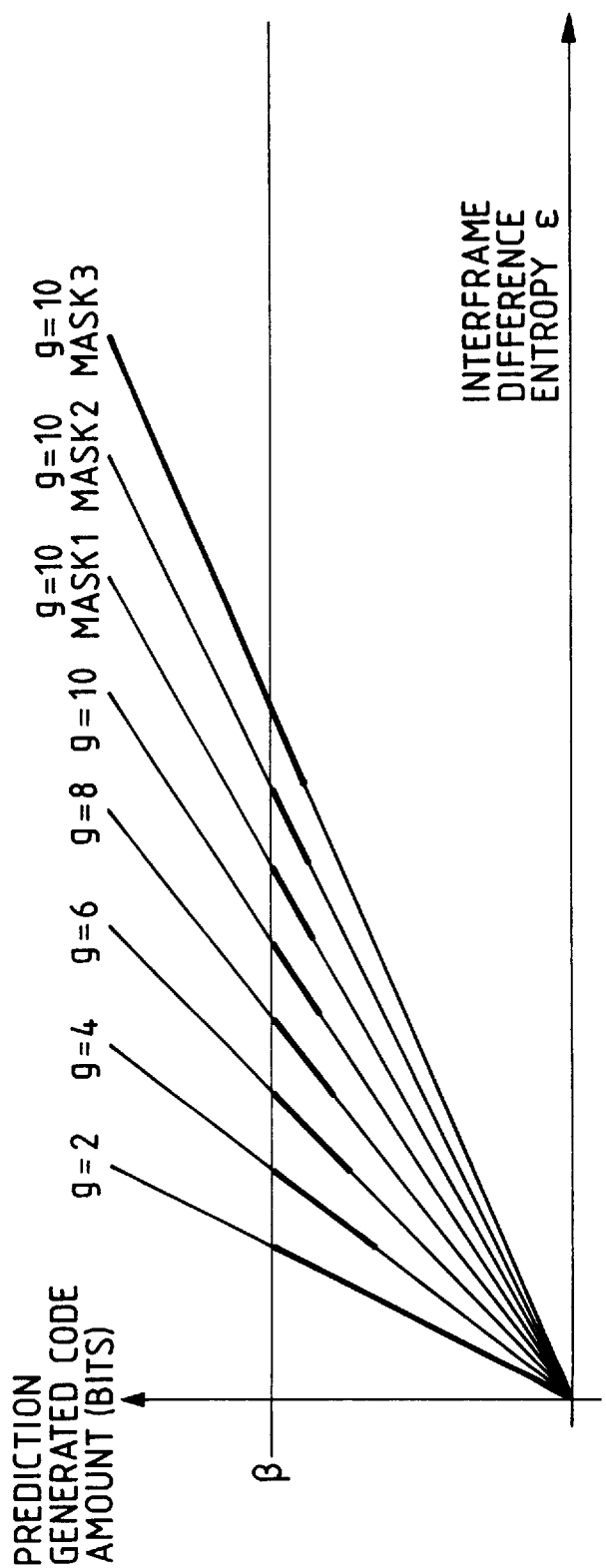
FIG. 11 illustrates a method for determining a threshold of a quantization step from a frame rate and a transmission line speed in the third embodiment.

Referring to FIGS. 10 to 12, a determination process of the quantization step g and the mask level conducted by the quantization step and mask level determination circuit 21 is explained. FIGS. 10 to 12 correspond to FIGS. 3 to 5 of the first embodiment.

FIG. 10 shows a relation between the entropy ε and the generated code quantity. In FIG. 10, mask1 to mask3 represent masks for the DCT transform coefficient, and the shape of the mask is shown in FIGS. 13A to 13C.

In FIGS. 13A to 13C, each of the masks mask1 to mask3 indicates the shape of the mask for the DCT transform coefficient when the difference data of the 8×8 pixels explained in the first embodiment is DCT transformed. The mask1 of FIG. 13A indicates to use only the left top 4×4 of the 8×8 transform coefficients, the mask2 of FIG. 13B indicates to use only the 2×2 thereof, and the mask3 of FIG. 13C indicate to use only one of them. The image DCT transformed and decoded by using those masks mask1 to mask3 have resolution of ½, ¼ and ⅛ to that of the original image, respectively. However, as will be discussed later, the high image quality is maintained by setting the upper limit to the quantization step and the generated code quantity in the large entropy area can be suppressed low to compared with the second embodiment.

Turning back to FIG. 10, a line of the following formula is drawn on the graph of FIG. 10 as they are in the first and second embodiments and it is shown in FIG. 11.

$$\text{Bits}=\beta=B_0/f \qquad (8)$$

The allocation of the quantization step g to the entropy ε is shown in FIG. 12. The masking is made in the area of ε>γ. The mask includes four levels, level 0 (no mask), level 1 (mask1), level 2 (mask2) and level (mask3) and the level is sent from the quantization step and mask level determination circuit 21 to the encoder 7 as the mask signal S11. The encoder 7 encodes in the same manner as that in the first and second embodiments, and the level of the mask signal S11 is determined by the entropy ε and the level is sent to the encoder 7 as described above. For example, when the entropy ε is in a larger area than the value γ, one mask is selected from the three masks of FIGS. 13A to 13C and the mask is applied to the DCT transform coefficient corresponding to the elements of the difference block data of FIG. 9 and then it is encoded by the encoder 7.

Comparing FIG. 12 of the present embodiment with FIG. 8 of the second embodiment, the lower limit of the area in which the generated code quantity increases as the entropy ε increases is δ in FIG. 12 while it is α in FIG. 8 where δ>α. Namely, in the present embodiment, in the large entropy area, the frame rate is prioritized over the resolution if image.

In accordance with the present embodiment, where the entropy ε of the difference between frames is small to some extent, the image output with both the image quality and the frame rate being maintained can be outputted, and when it exceeds the predetermined threshold, the image output is lowered while the frame rate is maintained.

It should be understood that the present invention may be implemented in various other forms without departing from the spirit and principal features.

For example, in the first to third embodiments, the entropy of the difference between the current frame image (original image) and the one-frame previous decoded image (entire field decoded image) to determine the quantization step g. Alternatively, the quantization step g may be determined by the entropy of the difference between the original image and the one-frame previous original image. Further, instead of determining the entropy by using the entire field, the entropy may be determined by using a portion of the field (including sub-sampling).

In other words, the forgoing description of the embodiments has been given for illustrative purposes only and not to be construed as imposing any limitation in every respect.

The scope of the invention is, therefore, to be determined solely by the following claims and not limited by the text of the specifications and the alterations made within the scope equivalent to the scope of the claims fall within the true spirit and scope of the invention.

What is claimed is:

1. An image encoding apparatus comprising:
   input means for inputting image data;
   frame rate input means for inputting frame rate information representing a frame rate;
   calculation means for calculating an inter-picture difference entropy of the image data;
   control means for controlling a quantization step in accordance with the inter-picture difference entropy and the frame rate information; and
   encoding means for encoding the image data in accordance with the quantization step controlled by said control means.

2. An image encoding apparatus according to claim 1, wherein said encoding means includes transform means for orthogonally transforming the image data and quantization means for quantizing the image data transformed by said transform means.

3. An image encoding apparatus according to claim 2, wherein said transform means includes mask means for partially masking transform coefficients of the image data transformed by said transform means.

4. An image encoding apparatus according to claim 3, further comprising multiplexing means for multiplexing the image data encoded by said encoding means and step data for the quantization step controlled by said control means.

5. An image encoding apparatus according to claim 4, further comprising record means for recording the image data multiplexed by said multiplexing means on a recording medium.

6. An image encoding apparatus according to claim 1, wherein the entropy is calculated using a summation, over plural data values, of an estimated probability of each said data value occurring in a data block times a logarithm of the estimated probability of said data value occurring in the data block, wherein the data block is based on a block of the input image data.

7. An image encoding apparatus according to claim 1, wherein said input means includes image pickup means for photographing an object image.

8. An image encoding apparatus comprising:
   input means for inputting image data;
   frame rate input means for inputting frame rate information representing a frame rate;
   calculation means for calculating an entropy of the image data;
   mask means for performing a masking processing on the image data by using a mask, said mask means determining a mask area of said mask in accordance with a predetermined relationship between the entropy and the frame rate information; and encoding means for encoding the image data processed by said mask means.

9. An image encoding apparatus according to claim 8, wherein the image data inputted by said input means is data of block comprising a plurality of pixels.

10. An image encoding apparatus according to claim 8, further comprising record means for recording the image data encoded by said encoding means on a recording medium.

11. An image encoding apparatus according to claim 8, wherein the entropy is calculated using a summation, over plural data values, of an estimated probability of each said data value occurring in a data block times a logarithm of the estimated probability of said data value occurring in the data block, wherein the data block is based on a block of the input image data.

12. An image encoding apparatus according to claim 8, wherein said input means includes image pickup means for photographing an object image.

13. An image encoding apparatus according to claim 8, further comprising transform means for transforming the image data into at least one orthogonal transform coefficient, wherein said mask means masks the at least one transform coefficient.

14. An image encoding apparatus according to claim 13, wherein the at least one transform coefficient includes a transform coefficient of a high frequency component of the image data, and wherein said mask means masks the transform coefficient of the high frequency component.

15. An image encoding apparatus according to claim 8, further comprising control means for controlling a quantization step in accordance with the entropy, wherein said encoding means encodes the image data processed by said mask means in accordance with the quantization step controlled by said control means.

16. An image encoding apparatus according to claim 15, wherein said mask means performs the mask processing only when the entropy is greater than a predetermined value.

17. An image encoding method comprising the steps of:
inputting image data;
inputting frame rate information representing a frame rate;
calculating an inter-picture difference entropy of the image data;
controlling a quantization parameter in accordance with the inter-picture difference entropy and the frame rate information; and
encoding the image data in accordance with the quantization parameter controlled in said controlling step.

18. An image encoding method according to claim 17, wherein the entropy is calculated using a summation, over plural data values, of an estimated probability of each said data value occurring in a data block times a logarithm of the estimated probability of said data value occurring in the data block, wherein the data block is based on a block of the input image data.

19. An image encoding method comprising the steps of:
inputting image data;
inputting frame rate information representing a frame rate;
calculating an entropy of the image data;
masking, by performing a masking processing on the image data by sing a mask, said masking step including a step, of determining a mask area of said mask in accordance with a predetermined relationship between the entropy and the frame rate information; and
encoding the image data processed in said masking step.

20. An image encoding method according to claim 19, wherein the entropy is calculated using a summation, over plural data values, of an estimated probability of each said data value occurring in a data block times a logarithm of the estimated probability of said data value occurring in the data block, wherein the data block is based on a block of the input image data.

* * * * *